(12) United States Patent
King

(10) Patent No.: US 7,318,048 B1
(45) Date of Patent: *Jan. 8, 2008

(54) METHOD OF AND SYSTEM FOR AUTHORIZING PURCHASES MADE OVER A COMPUTER NETWORK

(75) Inventor: Douglas W. King, Santa Maria, CA (US)

(73) Assignee: Rysix Holdings LLC, Chicago, IL (US)

( * ) Notice: Subject to any disclaimer, the term of this patent is extended or adjusted under 35 U.S.C. 154(b) by 412 days.

This patent is subject to a terminal disclaimer.

(21) Appl. No.: 09/657,285

(22) Filed: Sep. 7, 2000

Related U.S. Application Data

(63) Continuation-in-part of application No. 09/391,285, filed on Sep. 7, 1999.

(51) Int. Cl.
*G06Q 30/00* (2006.01)

(52) U.S. Cl. .......................... 705/39; 705/26; 705/27; 705/37; 705/38; 705/40; 705/41

(58) Field of Classification Search ................. 705/16, 705/17, 18, 26, 27, 41, 42, 43, 64, 65, 72, 705/75, 66, 37, 38, 39, 40
See application file for complete search history.

(56) References Cited

U.S. PATENT DOCUMENTS

| | | | | |
|---|---|---|---|---|
| 4,822,985 A | 4/1989 | Boggan et al. | ............ | 235/380 |
| 4,870,259 A | 9/1989 | Boggan et al. | ............ | 235/380 |
| 4,908,521 A | 3/1990 | Boggan et al. | ............ | 235/380 |
| 4,943,707 A | 7/1990 | Boggan | ............ | 235/380 |
| 5,177,342 A | 1/1993 | Adams | ............ | 235/379 |
| 5,703,344 A | 12/1997 | Bezy et al. | ............ | 235/379 |
| 5,708,422 A * | 1/1998 | Blonder et al. | ............ | 340/5.41 |
| 5,809,143 A | 9/1998 | Hughes | | |
| 5,815,577 A | 9/1998 | Clark | | |
| 5,826,245 A | 10/1998 | Sandberg-Diment | | |
| 5,903,721 A | 5/1999 | Sixtus | | |
| 5,903,878 A * | 5/1999 | Talati et al. | ................ | 705/26 |
| 5,920,847 A | 7/1999 | Kolling et al. | ................ | 705/40 |
| 5,930,777 A | 7/1999 | Barber | | |
| RE36,365 E | 11/1999 | Levine et al. | ............... | 235/380 |
| 6,014,636 A | 1/2000 | Reeder | | |
| 6,016,476 A | 1/2000 | Maes et al. | | |

(Continued)

*Primary Examiner*—Nga Nguyen
(74) *Attorney, Agent, or Firm*—Baker & Hostetler LLP

(57) ABSTRACT

A method of and system for authorizing purchases made over a computer network is provided. In accordance with the present invention, a consumer electronically transmits an ATM card number over the network to an on-line merchant from which the consumer desires to make a purchase. The on-line merchant then electronically forwards the ATM card number to a third party contractor, such as a bank, that will oversee and authorize the transaction. The third party contractor subsequently determines an authentication token type associated with the card and electronically prompts the consumer for the appropriate type of authentication token, such as a PIN or biometric signature or the like. The consumer then inputs and electronically transmits the authentication token over the network to the third party contractor, bypassing the on-line merchant. Having both the ATM card number and the authentication token, the third party contractor verifies that the ATM card number and authentication token are valid, checks for sufficiency of funds, and either authorizes or denies the transaction. The authorization or denial is communicated to the on-line merchant over the network, who either completes or rejects the purchase.

37 Claims, 4 Drawing Sheets

U.S. PATENT DOCUMENTS

| | | |
|---|---|---|
| 6,049,785 A | 4/2000 | Gifford |
| 6,052,675 A | 4/2000 | Checchio |
| RE36,788 E | 7/2000 | Mansvelt et al. ........... 235/379 |
| 6,098,053 A | 8/2000 | Slater |
| 6,105,008 A | 8/2000 | Davis et al. |
| RE37,122 E | 4/2001 | Levine et al. ............... 235/380 |
| 6,247,129 B1 * | 6/2001 | Keathley et al. ............ 713/156 |
| 6,270,011 B1 * | 8/2001 | Gottfried .................... 235/379 |
| 6,282,522 B1 | 8/2001 | Davis et al. .................. 705/41 |
| 6,285,991 B1 | 9/2001 | Powar ......................... 705/76 |
| 6,408,284 B1 | 6/2002 | Hilt et al. ..................... 705/40 |

* cited by examiner

METHOD OF AND SYSTEM FOR AUTHORIZING PURCHASES MADE OVER A COMPUTER NETWORK

CROSS-REFERENCE TO RELATED APPLICATION

This application is a continuation-in-part of U.S. patent application Ser. No. 09/391,285 for "Method of and System for Making Purchases over a Computer Network," filed Sep. 7, 1999, the disclosure of which is incorporated herein by reference in its entirety as though fully set forth herein.

BACKGROUND OF THE INVENTION

1. Field of the Invention

The present invention generally relates to a method of and system for authorizing purchases made over a computer network and, more particularly, to a method of and system for authorizing purchases of goods and services over the Internet or other non-secure computer network using an automated-teller-machine (ATM) card, debit card or any other card or account identifier which may require a valid personal-identification-number (PIN) or other authentication token for transaction authorization.

2. Description of the Prior Art

The use of personal computers by consumers to purchase goods and services over the Internet via the World Wide Web and e-mail has become very popular in recent years and constitutes an ever-increasing part of the economy.

As those of ordinary skill in the art know, the Internet is a global computer network which comprises a vast number of interconnected computers. The interconnected computers exchange information using, inter alia, e-mail and the World Wide Web (hereinafter, the "WWW").

E-mail refers to the transmission of electronic mail messages over the Internet from one computer to another. The WWW, on the other hand, allows a Web server computer system to send graphical Web pages of information to a remote client computer system. The remote client computer system can then display the Web pages using a browser program or the like.

Each Web page of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A browser is a special-purpose application program that effects the requesting of Web pages and the displaying of Web pages. Commercially available browsers include Microsoft Internet Explorer™ and Netscape Navigator™.

Web pages are typically defined using HyperText Markup Language ("HTML") or other languages. As those of ordinary skill in the art know, HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

Because of its graphical and user friendly nature, the WWW is particularly well suited for e-commerce, i.e., the transacting of business on-line. Today, thousands of companies throughout the world provide goods and services to consumers using Web sites. Consumers can connect to these Web sites and purchase the goods and/or services offered by the particular companies.

In making a purchase over the Internet, the typical consumer uses a credit card or ATM card. After making his purchase selection, the consumer transmits his card information over the Internet to the on-line merchant. The on-line merchant then contacts the issuing bank to verify the card information and obtain authorization to complete the transaction. Depending on the response from the bank, the on-line merchant either accepts or rejects the purchase.

Because the Internet is a non-secure (i.e., public) network, there is a danger that the consumer's credit card or ATM card information will be intercepted by a third party. If that third party is dishonest, he/she can make illegal charges to the credit card or, in the case of an ATM card, remove money directly from the consumer's bank account. In recent years, numerous approaches have been implemented to reduce this security risk. The most popular approach has been sophisticated encryption techniques which render the credit card or ATM card data virtually unreadable to third parties, such as 128-bit secure-sockets-layer (SSL) encryption.

When making purchases over the Internet using an ATM card, however, security considerations take on an added importance because, unlike with transactions at ATM machines, PINs or other authentication tokens, such as biometric signatures or passwords, are presently not used in ATM card transactions on the Internet. Thus, should the ATM card number fall into the hands of an unscrupulous third party, the card-holder's entire bank account can be wiped out through fraudulent Internet transactions.

One way to overcome this problem is to require the use of authentication tokens in ATM transactions on the Internet. This has not been possible to date, however, because on-line merchants do not have the ability to verify PINs or other authentication tokens. Additionally, it is not desirable to provide the on-line merchant with both the ATM card number and the corresponding authentication token since unscrupulous employees of the on-line merchant can use the authentication token to illegally access the card-holder's bank account and withdraw money therefrom.

Accordingly, it is an object of the present invention to provide a new method of and system for authorizing purchases made over the Internet using an ATM card wherein a valid authentication token is required in order to obtain authorization for a given purchase. It is another object of the present invention to provide a new method of and system for authorizing purchases made over the Internet using an ATM card wherein a valid authentication token is required in order to obtain authorization for a given purchase, and wherein the authentication token is not supplied to the on-line merchant. It is another object of the present invention to provide a new method of and system for authorizing purchases made over the Internet using an ATM card wherein a valid authentication token is required in order to obtain authorization for a given purchase, and wherein any one or more of a plurality of authentication token types may be used. Other objects of the present invention will become apparent from the following discussion.

SUMMARY OF THE INVENTION

In accordance with a first aspect of the present invention, a method of authorizing purchases made over a non-secure computer network using an ATM card is provided. In accordance with said method, after making a purchase selection, a consumer electronically transmits the ATM card number over the network to an on-line merchant. The on-line merchant then electronically forwards the ATM card number to a third party contractor, such as a bank, that will oversee and authorize the transaction. The third party contractor then determines the authentication token type associated with the card and electronically prompts the consumer for the appropriate type of authentication token, such as a PIN or biometric signature or the like. The consumer then inputs and electronically transmits the authentication token over the network to the third party contractor, bypassing the on-line merchant. Having both the ATM card number and the authentication token, the third party contractor verifies that the ATM card number and authentication token are valid, checks for sufficiency of finds or other restrictions, and either authorizes or denies the transaction. The authorization or denial is communicated to the on-line merchant over the network, who either completes or rejects the purchase.

In accordance with a second aspect of the present invention, a system for authorizing purchases made over a non-secure computer network using an ATM card is provided. The system includes first, second and third computers connected to a computer network. The first computer is used by a consumer to transmit the consumer's ATM card number over the network to the second computer, which is operated by or for the on-line merchant. The second computer then forwards the ATM card number over the network to the third computer, which is operated by or for the third party contractor. The third computer then determines the authentication token type associated with the card and prompts the consumer for the appropriate type of authentication token. The consumer then inputs the authentication token into the first computer, which transmits the authentication token over the network to the third computer, bypassing the second computer. The third computer then verifies that the ATM card number and authentication token are valid and that there are sufficient finds in the bank account to cover the transaction amount and that no other restrictions apply. The third computer then transmits the results of the verification procedure to the second computer. Depending on the validation results, the purchase is either completed or rejected.

The present invention will now be described in greater detail, with frequent reference being made to the drawings identified below in which identical numerals represent identical elements.

DESCRIPTION OF THE PREFERRED EMBODIMENT

The following description is presented to enable any person of ordinary skill in the art to make and use the present invention. Various modifications to the preferred embodiment will be readily apparent to those of ordinary skill in the art, and the principles defined herein may be applied to other embodiments and applications without departing from the spirit and scope of the appended claims. Thus, the present invention is not intended to be limited to the embodiment shown, but is to be accorded the broadest scope consistent with the principles and features disclosed herein.

Figure 1:
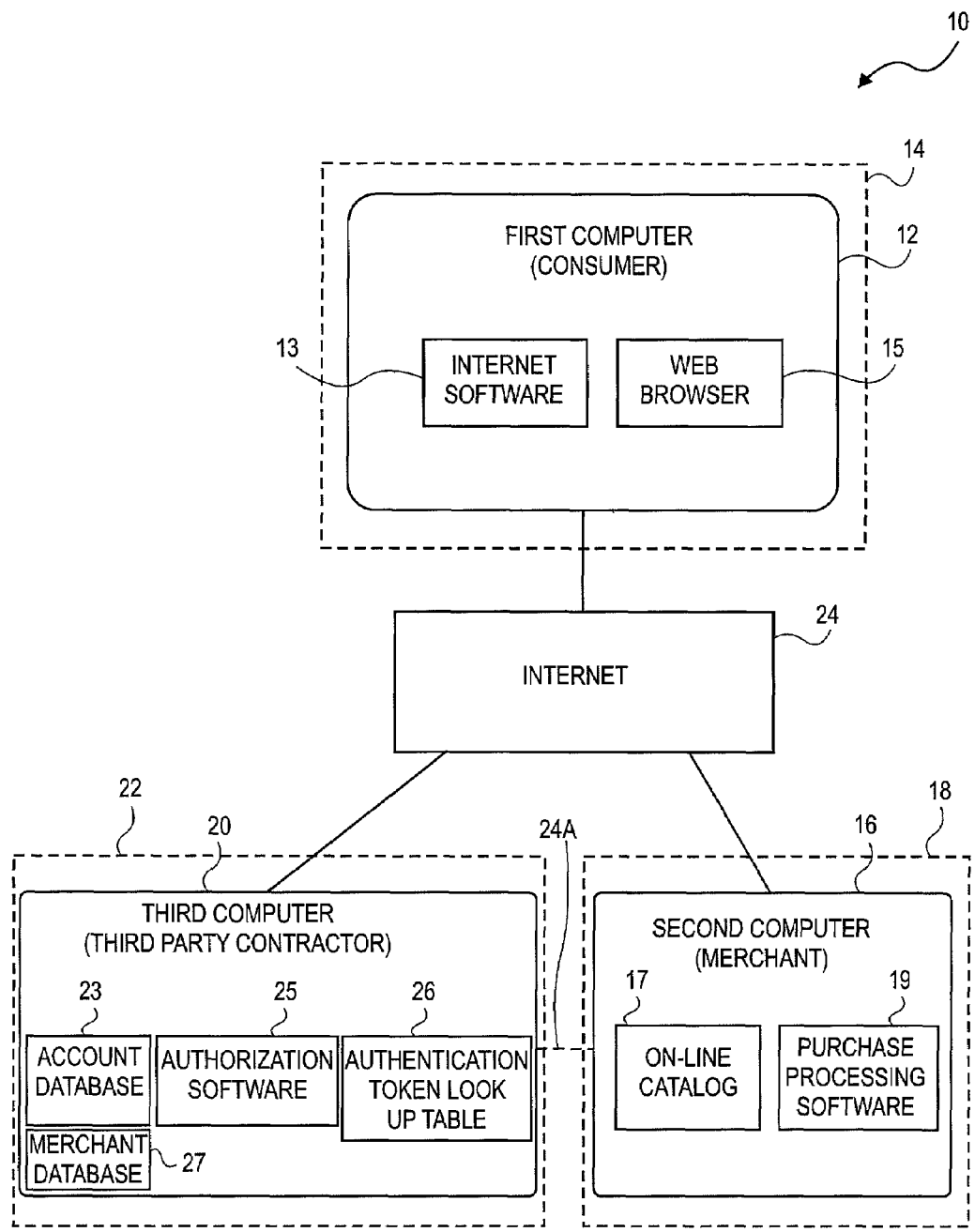
FIG. 1 is a block diagram of a system in accordance with one embodiment of the present invention.

A block diagram of a system 10 in accordance with one embodiment of the present invention is shown in FIG. 1. The system 10 includes a first computer 12 at a consumer location 14, a second computer 16 at an on-line merchant location 18, and a third computer 20 at a third party contractor location 22. The three computers 12, 16, 20 are connected together over a computer network 24 which, for purposes of this discussion, is the WWW portion of the Internet, although the present invention may be practiced on any public or private computer network. The second computer 16 and third computer 20 may optionally be connected over a private network or a direct data connection rather than the Internet, as indicated by the dashed line 24A connecting the second computer 16 and third computer 20 in FIG. 1. As used herein, the term "computer" refers to any data processing device which can be configured to perform the functions described herein and the term "computer network" refers to any type of communications network over which computers can communicate with one another.

The first computer 12, which will generally be located at the consumer's home or business (consumer location 14), will typically be a conventional personal computer (PC) that includes a chassis that houses a central processing unit (CPU) and supporting circuitry, as well as a floppy drive, a hard drive and an internal modem. Connected to the CPU through the chassis are a keyboard, a mouse and a monitor. The keyboard and mouse are used by the consumer to control the operation of the first computer 12 and to input information into the first computer 12. The first computer 12 will usually be coupled to the Internet 24 via a telephone line connected to the modem, although the computer can be connected to the Internet via a high speed data transmission line. The consumer will typically connect to the Internet using an Internet service provider, such as Erols™ or America OnLine™, but may have a direct connection to the Internet. To this end, the first computer 12 has stored in memory Internet software 13 which enables connection to the Internet and a Web browser 15, such as Microsoft Internet Explorer™ or Netscape Navigator™, which enables the consumer to browse Web sites on the WWW.

Although a conventional PC will typically be used by the consumer, the consumer may use any type of computer that can be connected to the Internet, including a work station on a local area network or a wireless device such a cellular telephone or personal-digital-assistant, and any operating system. The particular details of the first computer 12 are largely irrelevant to the present invention, as long as the first computer 12 is capable of performing the functions described herein. The first computer 12 merely serves as a convenient interface for the consumer to place orders for goods and services over the Internet.

Next shown in FIG. 1 is the second computer 16 which is located at the on-line merchant location 18. The second computer 16 will preferably be a more powerful machine than a personal computer, such as a workstation, although a personal computer may also be used by the on-line merchant. Again, the particular details of the second computer 16 are largely irrelevant to the present invention, as long as the second computer 16 is capable of performing the functions described herein.

Typically, the second computer 16 will be a Web server (a computer that provides direct access to the WWW on the Internet and includes the necessary hardware, operating system, Web server software, TCP/IP protocols and Web site content) owned and operated by the on-line merchant or by an Internet service provider with whom the on-line merchant has contracted. For purposes of this discussion, the on-line merchant location 18 refers to the location of the second computer 16, and not necessarily the actual physical location of the on-line merchant.

Preferably, the second computer 16 will be running Windows NT™ 4.0, using Internet Information Server™ 4.0 and Commerce Server™ 3.0. The CPU of the second computer 16 must have acceptable power and should have at least 64 megabytes of RAM.

The second computer 16 will typically have an on-line catalog 17 in memory which can be accessed and browsed by the consumer over the Internet 24 through an appropriate graphical use interface (GUI) supplied by the on-line merchant in the form of HTML pages, as well as purchase processing software 19 which is used to process ATM card purchases as further described herein.

Next shown in FIG. 1 is the third computer 20 which is located at the third party contractor location 22. The third party contractor is an independent, insured organization, such as a bank, that has contracted with the on-line merchant to provide ATM services. Although the third computer 20 can be a personal computer, as with the second computer 16 it will preferably be a much more powerful machine, such as a workstation. The third computer 20 is likewise preferably a Web server owned and operated by the third party contractor or by an Internet service provider with whom the third party contractor has contracted. The third party contractor location 22 refers to the location of the third computer 20 and not necessarily the actual physical location of the third party contractor. As shown in FIG. 1, the third computer 20 includes an optional account database 23 containing account information (e.g., account number, ATM card number, authentication token, account balance) for account holders of the third party contractor, authorization software 25 for performing the purchase authorization functions described herein below, a look up table 26 which contains a listing of authentication token types used by various card issuers indexed by bank identification number (BIN), and a merchant database 27 which is used to store transaction and other account data for merchants who have contracted with the third party contractor to receive ATM services.

As with the first and second computers 12, 16, the particular details of the third computer 20 are largely irrelevant to the present invention, so long as the third computer 20 is capable of performing the functions described herein. Preferably, however, the third computer is Compaq ProLiant™ server running at 500 MHZ with 128 MB RAM and using Windows NT™ 4.0.

Figure 2:
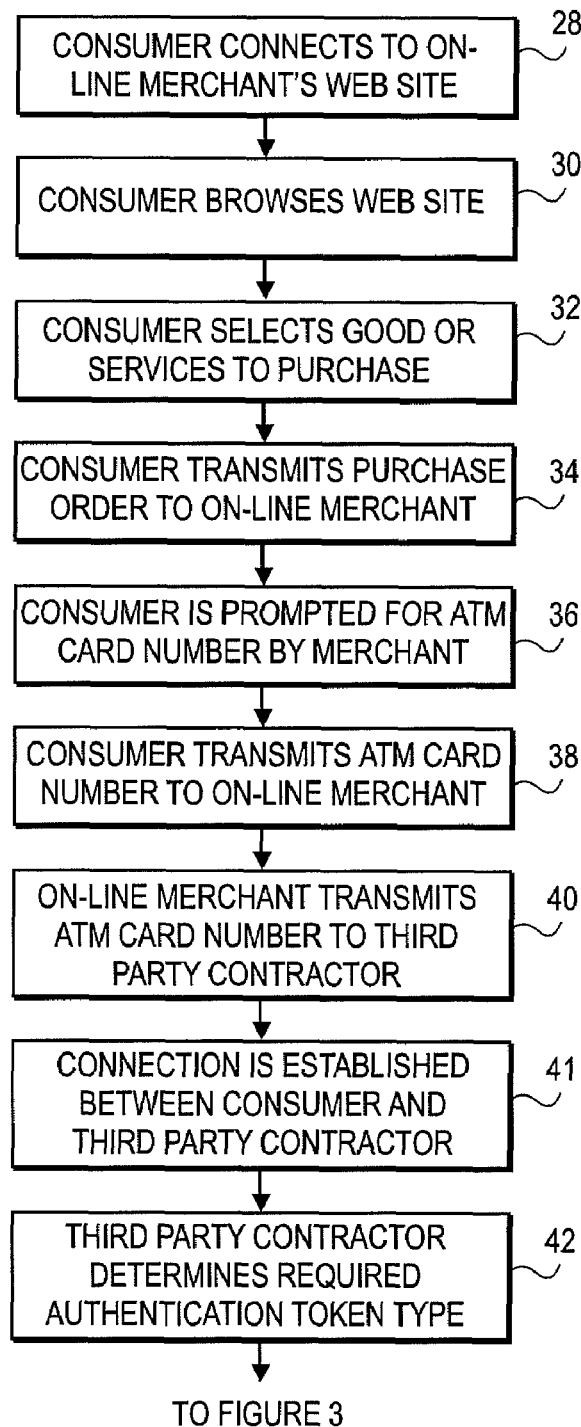
FIGS. 2 and 3 are flowcharts illustrating the operation of the system of FIG. 1.
Figure 3:
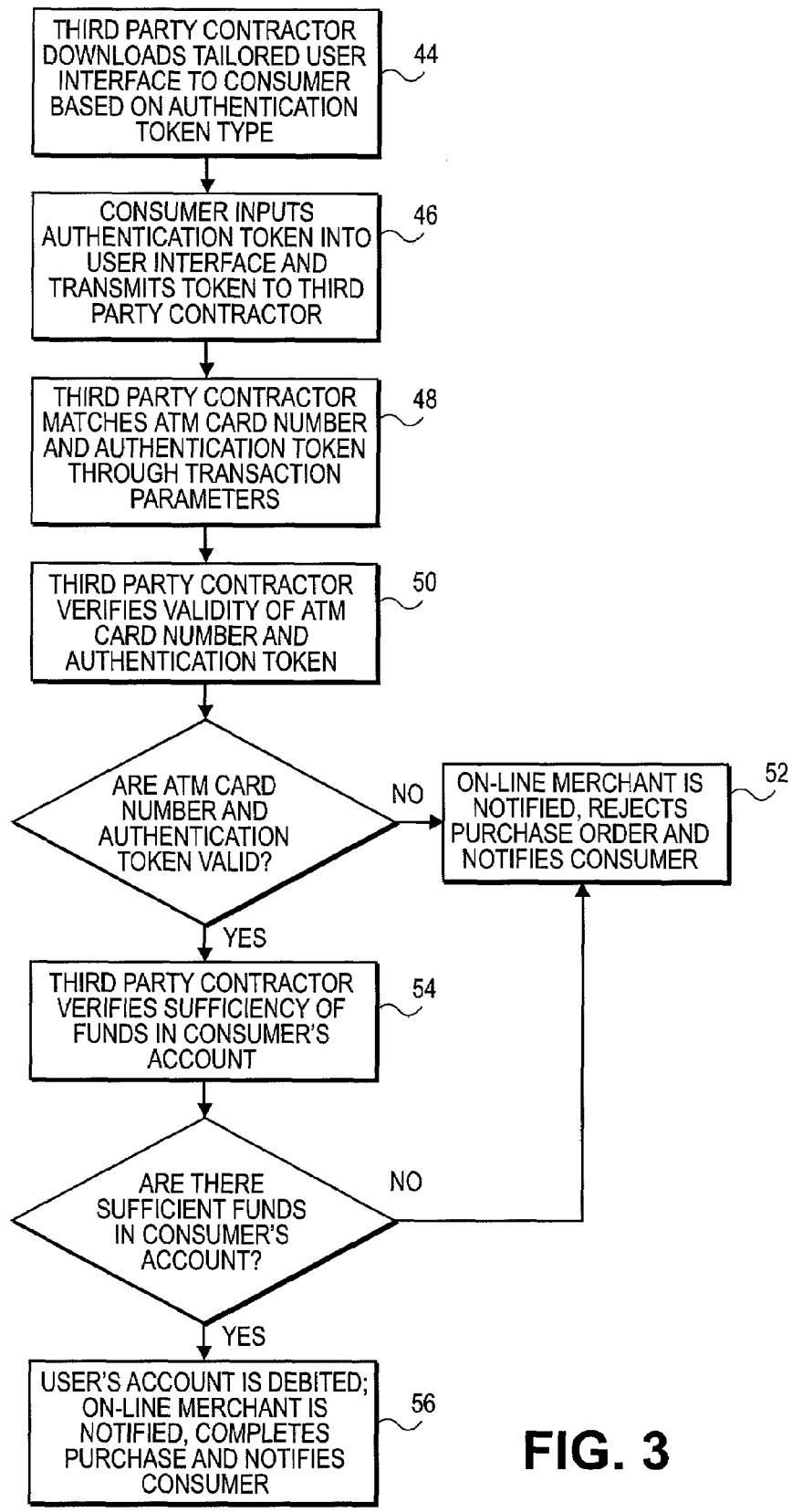

The flow charts provided in FIGS. 2 and 3 illustrate the operation of the system 10. The consumer initially establishes a connection over the Internet 24 between the first computer 12 and the second computer 16 by accessing the on-line merchant's Web site using the Web browser 15 (step 28). Then, using the GUI supplied by the on-line merchant in the form of HTML pages, the consumer browses the on-line catalog 17, selecting which goods and/or services he wishes to purchase (steps 30 and 32). Once the consumer makes his selection and is ready to place an order, the consumer transmits a purchase order message over the Internet to the on-line merchant using the Web browser 15 (step 34).

At this point the purchase processing software 19 is activated. The consumer is first prompted for his payment information by the merchant via an appropriately configured HTML page (step 36). For purposes of the present discussion, the payment information is an ATM card number and expiration date, although the payment information can include additional data such as the consumer's name and address. The consumer then inputs the requested payment information into the HTML page and transmits the payment information over the Internet to the second computer 16 via the browser 15 (step 38). As used herein, the term "ATM card" includes bank cards, debit cards and any other cards or account identifiers for which the issuing bank or organization may require a valid authentication token, such as a PIN, a biometric signature, an authorization code stored on a smart card, or password, for use. The payment information is preferably transmitted over the Internet using an encrypted connection, such as 128-bit encryption SSL. Those of ordinary skill in the art will appreciate that an initial step may be added which requires the consumer to select a method of payment. If the method of payment selected by the consumer is something other than an ATM card (as that term is herein defined), then the purchase will not be processed in accordance with the present invention.

In the preferred embodiment, upon receipt of the ATM card number, the second computer 16 creates a unique session identifier by combining the on-line merchant's IP (Internet Protocol) address, which uniquely identifies the on-line merchant, with an incremented transaction serial number. The second computer 16 then performs two simultaneous or nearly simultaneous functions. First, the second computer 16 forwards the ATM card number, expiration date, the unique session identifier, a merchant identifier, such as a merchant identification number or name, the purchase price, and other optional relevant transaction parameters, such as the local date and time of transaction, a currency code if the transaction is not in U.S. dollars, the consumer's name and address, and identifiers relating to the on-line merchant's bank account, in a data packet over the Internet 24 or, alternatively, a private network or direct connection 24A, to the third computer 20 at the third party contractor location 22 (step 40). If data transmission is over the Internet, SSL encryption is preferably used.

Upon receipt of the data packet from the second computer 16, the third computer 20 may optionally perform a security check to ensure that a valid merchant, and not a hacker, has sent the data package. This may be accomplished by, for example, comparing the merchant identifier against the merchant database 27. Assuming the merchant is validated by the security check, the third computer 20 temporarily stores the data packet in memory in a queue to be matched with the authentication token (see below).

The data packet transmitted by the second computer 16 to the third computer 20 is preferably transmitted in an industry standard format, such as ISO 8583 or VISA-K. These data formats are commonly used and are well-known to those of ordinary skill in the art. However, those of ordinary skill in the art will appreciate that the present invention is not limited to any particular data format, and can be used with any format which might be required by the merchant, including proprietary data formats.

At the same time or nearly at the same time the second computer 16 transmits the data packet to the third computer 20, the second computer 16 also downloads to the first computer 12 an HTML file, which contains a command, preferably in the form of a Java script, which causes the consumer's Web browser 15 to open a new window and issue an HTTP request to the third computer 20 in order to establish a connection between the first computer 12 and the third computer 20 (step 41). This HTTP request also includes transaction parameters which uniquely identify the transaction, including the ATM card number, the purchase amount, the unique identifier, and the merchant identifier. Alternatively, the Java script could also have been embedded in the HTML page downloaded to the first computer 12 in step 36 so that the connection between the first computer 12 and the third computer 16 is established when the ATM card number is transmitted to the second computer at step 38.

Upon receipt of the request from the first computer 12, the third computer 20 optionally performs a security check on the content of the data and its source. Assuming that the request is legitimate, the third computer 20 next determines the type of authentication token required by the issuer of the consumer's ATM card (step 42). The authentication token may be, for example, a PIN, a biometric signature such as a fingerprint or retinal image, an authorization code stored on a smart card, a password, or a combination of the foregoing. In the preferred embodiment of the present invention, this determination is based on the ATM card number. All ATM cards having the same initial six digits (referred to as a bank identification number, or BIN) are issued by a given issuer. Thus, based on the BIN, the card issuer, and thus the type of authentication token used by the particular card issuer, can readily be determined by reference to the look up table 26.

Other methods may be used to determine the authentication token type as well. For example, the user may be asked to indicate the authentication token type when he/she initially transmits the ATM card number to the on-line merchant. The authentication token type would then be transmitted from the second computer 16 to the third computer 20. This approach, however, requires the consumer to take an additional step and requires the merchant to modify his order page to include an additional data field. This is less desirable than having the third computer 20 determine the authentication token type based on the card number as discussed above.

Based on the determined authentication token type, an HTML user interface tailored for the particular authentication token type is downloaded to the first computer 12 and queries the user for his authentication token (step 44). Embedded in the downloaded HTML page are the unique identifier, the merchant identifier, the purchase price and other optional relevant transaction parameters, such as a partial account number for verification by the consumer and a unique tracking number issued by the third computer 20.

If the authentication token is a PIN, the interface might be a GUI resembling an ATM, as shown in FIG. 3 of the parent application, U.S. patent application Ser. No. 09/391,285. If the authentication token is a fingerprint or retinal image, the user interface might ask the user to input his fingerprint or retinal image using a scanner or camera connected to the first computer 12. If the authentication token is an authorization code stored on a smart card, the user interface might ask the user to insert a smart card into a smart card reader attached to the first computer 12. If the authentication token is a password, the user interface might ask the user to type his password into the first computer 12 using the keyboard. The benefit of this approach is that any type of authentication token which might be used by a card issuer can be used without having to modify the merchant's Web site.

After the user inputs the authentication token, the token, together with the unique identifier and other transaction parameters that were embedded in the downloaded HTML user interface as described previously, are transmitted in a data packet from the first computer 12 to the third computer 20 by the browser over the Internet (step 46). The connection between the first computer 12 and third computer 20 is encrypted and is independent of the connection between the first computer 12 and the second computer 16 so that the on-line merchant is never in possession of the authentication token. The data packet is queued in memory on the third computer 20.

The third computer 20 next verifies that the ATM card number and authentication token are valid. Because the third-party contractor may be overseeing multiple transactions at any given time, the third computer 20 must first match the authentication token with the corresponding ATM card number. To do this, the third computer 20 matches the transaction parameters contained in the data packets received from the first and second computers 12, 16 (step 48). For security reasons, data packets stored in the queue expire if no match is found within a pre-configured time period, e.g., two minutes. Once the data packets from the first and second computers 12, 16 are matched by the third computer 20, the third computer checks the validity of the ATM card number and authentication token (step 50). If the ATM card number or the authentication token are invalid or have expired, the third computer 20 so informs the second computer 16 and the on-line merchant rejects the purchase order and notifies the consumer (step 52). If the ATM card number and authentication token are valid, the third computer 20 checks to see whether there are sufficient funds in the consumer's account to cover the purchase price or whether there are any other restrictions which might prevent the purchase (step 54). If there are sufficient funds in the account and no restrictions apply, the third computer transmits an authorization message to the second computer, debits the consumer's account, the purchase is completed and the consumer is notified (step 56). If there are insufficient funds, or any other restrictions apply, a rejection message is transmitted, the on-line merchant rejects the purchase and the consumer is notified (step 52).

Those of ordinary skill in the art will appreciate that an additional step can optionally be added to the validation process wherein the ATM card number and authentication token are examined to determine whether they have been transmitted in the proper format. This additional step reduces the impact of fraudulent activities by unscrupulous parties.

If the ATM card was issued by the third party contractor, the validation steps (50-56) may be accomplished by simply accessing the account database 23 or another database in or connected to the third computer 20. If, however, the ATM card was issued by another bank, then the third party contractor must verify the card information by contacting the issuing bank, either directly over a secure line, through a private ATM network, such as CIRRUS, or through any other available avenue.

Once the transaction is completed, the transaction particulars are preferably recorded in the merchant database 27 for record-keeping purposes. The on-line merchant will later be credited for the on-line purchase during a periodic settlement and clearance process which is well known to those of ordinary skill in the art and which may be readily implemented with the system 10.

Figure 4:
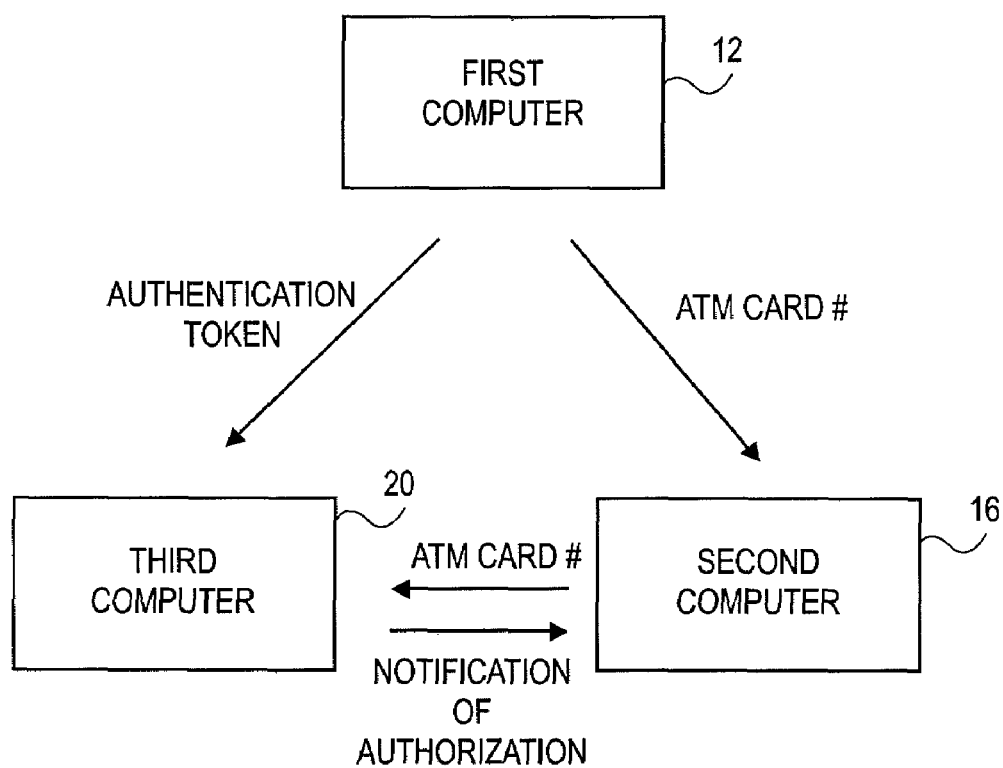
FIG. 4 is a schematic diagram illustrating the transfer of data in the system of FIG. 1.

The flow of data among the first, second and third computers is schematically shown in FIG. 4. As is clear from FIG. 4, the ATM card number and the authentication token are never transmitted together and the on-line merchant is never in possession of both the ATM card number and the authentication token. Thus, the danger that an unscrupulous hacker or employee of the on-line merchant will obtain the ATM card number and authentication token and steal money from the consumer's account is eliminated.

Those of ordinary skill in the art will appreciate the versatility of the present invention. Because the user interface for the authentication token is tailored at the third party contractor's computer, rather than at the on-line merchant's computer, on-line merchants are free to enter into transactions without regard to authentication token type since their Web sites do not have to be modified in any way to handle different types of authentication tokens.

While the embodiment discussed herein relates to the WWW, those of ordinary skill in the art will further appreciate that the present invention is not limited to the WWW, but may be used on any type of public or private computer network without departing from the scope of the appended claims.

Those of ordinary skill in the art will also appreciate that the present invention may be implemented using well-known computer programming techniques.

Thus, in accordance with the foregoing the objects of the present invention are achieved. Modifications to the present invention would be obvious to those of ordinary skill in the art, but would not bring the invention so modified beyond the scope of the appended claims.

What is claimed is:

1. A method of authorizing purchase transactions over a computer network using an account number that identifies a consumer's account from which funds will be withdrawn to pay a purchase price and an authorization token associated with said account number which, when used with said account number, enables withdrawal of funds from said account, said method comprising:

transmitting said account number electronically over said network from a consumer location to an on-line merchant location;

forwarding said account number electronically over said network from said on-line merchant location to a third party contractor location;

initiating a verification connection between said consumer location and said third party contractor location, said verification connection including a verification web browser window provided from said on-line merchant location to said consumer location to initiate said verification connection between said consumer location and said third party contractor location, said verification connection being independent of, and bypassing said on-line merchant location;

determining at said third party contractor location an authentication token type associated with said account number;

prompting a consumer at said consumer location to electronically transmit an authentication token in accordance with said determined authentication token type over said connection to said third party contractor location;

transmitting said authentication token electronically over said connection; and determining at said third party contractor location whether said account number and said authentication token are valid and, if so, then authorizing the purchase transaction to proceed.

2. The method according to claim 1 wherein said account number is transmitted over said network via encrypted connection and wherein said authentication token is transmitted over said connection via encrypted connection.

3. The method according to claim 1 wherein said network is the Internet and wherein said number is electronically transmitted from said on-line merchant location to said third party contractor location over the Internet.

4. The method according to claim 1 wherein said number is electronically transmitted from said on-line merchant location to said third party contractor location over a private computer network.

5. The method according to claim 1 including the additional step of determining at said third party contractor location whether said account has sufficient funds to cover said purchase price.

6. The method according to claim 1 including the additional step of electronically transmitting a message from said third party contractor location to said on-line merchant location indicating whether said account number and said authentication token are valid.

7. The method according to claim 5 including electronically transmitting a message from said third party contractor location to said on-line merchant location indicating whether there are sufficient funds in said account to cover said purchase price.

8. The system according to claim 1 wherein said authentication token type is at least one of a personal identification number, a biometric signature, an authorization code stored on a smart card, or a password.

9. The method according to claim 1 wherein said number is electronically transmitted from said on-line merchant location to said third party contractor location over a direct connection between the on-line merchant location and the third party contractor location.

10. The method according to claim 1 including the additional step of electronically transmitting a message over said network from said on-line merchant location to said consumer location whether said purchase has been authorized.

11. A method of authorizing a purchase to be made over a computer network using an account number that identifies a consumer's account from which funds will be withdrawn to pay a purchase price and an authentication token associated with said account number which, when used with said account number, enables withdrawal of funds from said account, said method comprising:

receiving said account number electronically transmitted from an on-line merchant location;

determining an authentication token type associated with said number;

establishing a verification connection between a consumer location and a third party contractor location, said verification connection including a verification web browser window provided from said on-line merchant location to said consumer location to initiate said verification connection between said consumer location and said third party contractor location, said verification connection being independent of, and bypassing said on-line merchant location;

prompting said consumer location to electronically transmit over said connection an authentication token in accordance with said authentication token type;

receiving said authentication token electronically transmitted over said connection; and verifying the validity of said number and said authentication token at said third party contractor location.

12. The method according to claim 11 wherein said network is the Internet and wherein said number is electronically transmitted from said on-line merchant location to said third party contractor location over the Internet.

13. The method according to claim 11 wherein said number is electronically transmitted from said on-line merchant location to said third party contractor location over a direct connection between the on-line merchant location and the third party contractor location.

14. The method according to claim 11 including determining at said third party contractor location whether said account has sufficient funds to cover said purchase price.

15. The method according to claim 11 wherein said computer is further configured to notify said on-line merchant's computer whether said account number and authorization token are valid.

16. The method according to claim 14 including the additional step of electronically transmitting a message from said third party contractor location to said on-line merchant location indicating whether there are sufficient funds in said account to cover said purchase price.

17. The method according to claim 11 wherein said authentication token type is at least one of a personal identification number, a biometric signature, an authorization code stored on a smart card, or a password.

18. The method according to claim 11 wherein said account number is electronically transmitted from said on-line merchant location to said third party contractor location over a private computer network.

19. A system for authorizing a purchase to be made over a computer network using an account number that identifies a consumer's account from which funds will be withdrawn to pay a purchase price and an authorization token associated with said account number which, when used with said number, enables withdrawal of funds from said account, said system comprising:

a computer connected to said network;

said computer being configured to receive said account number transmitted from an on-line merchant's computer, said computer being further configured to initiate a verification connection between a consumer's computer and a third party contractor computer, said verification connection including a verification web browser window provided from said on-line merchant's computer to said consumer's computer to initiate said verification connection between said consumer's computer and said third party contractor's computer, said verification connection being independent of, and bypassing said on-line merchant's computer, said computer being further configured to determine an authentication token type associated with said account number, prompt said consumer's computer to transmit over said connection an authentication token to said computer in accordance with said authentication token type, receive said authentication token transmitted over said network connection from said consumer's computer, and verify the validity of said number and said authentication token.

20. The system according to claim 19 wherein said network is the Internet and wherein said account number is transmitted from said on-line merchant's computer to said computer over the Internet.

21. The system according to claim 19 wherein said account number is transmitted from said online merchant's computer to said computer over a private computer network.

22. The system according to claim 19 wherein said account number is electronically transmitted from said on-line merchant's computer to said computer over a direct connection between the on-line merchant computer and said computer.

23. The system according to claim 19 wherein said computer is further configured to determine whether said account has sufficient funds to cover said purchase price.

24. The system according to claim 19 wherein said computer is further configured to notify said on-line merchant's computer whether said account number and authentication token are valid.

25. The system according to claim 23 wherein said computer is further configured to notify said on-line merchant's computer whether there are sufficient funds in said account to cover said purchase price.

26. The system according to claim 19 wherein said authentication token type is at least one of a personal identification number, a biometric signature, an authorization code stored on smart card, or a password.

27. A system for authorizing a purchase to be made over a computer network using an account number that identifies a consumer's account from which funds will be withdrawn to pay a purchase price and an authentication token associated with said number which, when used with said account number, enables withdrawal of funds from said account, said system comprising:

a first computer at a consumer location, said first computer being connected to said network;

a second computer at an on-line merchant location, said second computer being connected to said network; and a third computer at a third party contractor location, said third computer being connected to said network;

said first computer being configured to (1) transmit said account number over said network to said second computer and (2) transmit said authentication token over said network to said third computer;

said second computer being configured to forward said number received from said first computer to said third computer, said second computer being further configured to initiate a verification connection between said first computer and said third computer, said connection including a verification web browser window provided from said second computer to said first computer to initiate said verification connection between said first computer and said third computer, said verification connection being independent of, and bypassing said second computer; and said third computer being configured to (1) determine an authentication token type associated with said account number; (2) prompt said first computer to transmit an authentication token in accordance with said determined authentication token type over said network, and (3) determine whether said number and said authentication token are valid.

28. The system according to claim 27 wherein said first computer bypasses said second computer when transmitting said authentication token to said third computer.

29. The system according to claim 27 wherein said account number and said authentication token are transmitted via encrypted connections.

30. The system according to claim 27 wherein said account number is transmitted from said second computer to said third computer over a private computer network.

31. The system according to claim 27 wherein said account number is transmitted from said second computer to said third computer over a direct connection between the second computer and the third computer.

32. The system according to claim 27 wherein said third computer is further configured to determine whether said account has sufficient funds to cover said purchase price.

33. The system according to claim 32 wherein said third computer is further configured to notify said second computer whether there are sufficient funds in said account to cover said purchase price.

34. The system according to claim 27 wherein said second computer is further configured to notify said first computer whether said purchase is authorized.

35. The system according to claim 27 wherein said network is the Internet and wherein said account number is transmitted from said second computer to said third computer over the Internet.

36. The system according to claim 27 wherein said third computer is further configured to notify said second computer whether said account number and said authentication token are valid.

37. The system according to claim 27 wherein said authentication token type is at least one of a personal identification number, a biometric signature, an authorization code stored on a smart card, or a password.

* * * * *